United States Patent
Li et al.

(10) Patent No.: US 11,444,377 B2
(45) Date of Patent: Sep. 13, 2022

(54) RADIATION PATTERN RECONFIGURABLE ANTENNA

(71) Applicant: Aptiv Technologies Limited, St. Michael (BB)

(72) Inventors: Mingjian Li, Agoura Hills, CA (US); Zhengzheng Li, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 418 days.

(21) Appl. No.: 16/592,198

(22) Filed: Oct. 3, 2019

(65) Prior Publication Data
US 2021/0104818 A1  Apr. 8, 2021

(51) Int. Cl.
*H01Q 5/30* (2015.01)
*G01S 7/03* (2006.01)
*G01S 13/931* (2020.01)
*H01Q 1/32* (2006.01)
*H01Q 21/06* (2006.01)

(52) U.S. Cl.
CPC ............ *H01Q 5/30* (2015.01); *G01S 7/03* (2013.01); *G01S 13/931* (2013.01); *H01Q 1/3233* (2013.01); *H01Q 21/064* (2013.01); *H01Q 21/065* (2013.01)

(58) Field of Classification Search
CPC .......... G01S 7/03; G01S 13/931; H01Q 5/30; H01Q 5/314; H01Q 5/392
See application file for complete search history.

(56) References Cited

U.S. PATENT DOCUMENTS

| | | | | | |
|---|---|---|---|---|---|
| 3,522,610 | A | * | 8/1970 | Schroeder | H01Q 5/42 342/371 |
| 3,778,823 | A | * | 12/1973 | Sato | B60R 21/013 342/72 |
| 3,911,442 | A | * | 10/1975 | Hatch | H01Q 21/22 343/754 |
| 4,799,065 | A | * | 1/1989 | Thompson | H01Q 3/2658 342/372 |

(Continued)

FOREIGN PATENT DOCUMENTS

| CN | 106684561 | 5/2017 |
|---|---|---|
| CN | 107069230 | 8/2017 |

OTHER PUBLICATIONS

"Extended European Search Report", EP Application No. 20199635.2, dated Feb. 15, 2021, 8 pages.

*Primary Examiner* — Peter M Bythrow
(74) *Attorney, Agent, or Firm* — Sawtooth Patent Group PLLC

(57) ABSTRACT

A radiation pattern reconfigurable antenna includes an input port, a signal divider, a filter, and first and second radiators. The signal divider is connected to the input port and configured to divide a signal at the input port into a first output and a second output. The filter is connected to the second output, wherein the filter is configured to filter signal within a first frequency band and to pass signals within a second frequency band. The first radiator is configured to receive the signal from the first output of the signal divider, wherein the first radiator receives signals within the first frequency band and the second frequency band. The second radiator is connected to the filter to receive signals provided within the second frequency band.

20 Claims, 10 Drawing Sheets

(56) References Cited

U.S. PATENT DOCUMENTS

| | | | | |
|---|---|---|---|---|
| 4,933,680 | A * | 6/1990 | Shapiro | H01Q 3/22 |
| | | | | 342/368 |
| 5,936,588 | A * | 8/1999 | Rao | H04B 7/18519 |
| | | | | 343/754 |
| 8,836,596 | B2 * | 9/2014 | Richards | H01Q 15/24 |
| | | | | 343/756 |
| 9,660,316 | B2 | 5/2017 | Zhai et al. | |
| 10,056,922 | B1 * | 8/2018 | Tsvelykh | H01P 1/20345 |
| 11,005,179 | B2 * | 5/2021 | Achour | H01Q 21/061 |
| 2014/0375525 | A1 | 12/2014 | Shi | |
| 2018/0267143 | A1 | 9/2018 | Alcalde et al. | |
| 2018/0267555 | A1 | 9/2018 | Li et al. | |
| 2019/0115654 | A1 * | 4/2019 | Huang | H01Q 5/35 |
| 2019/0245276 | A1 | 8/2019 | Li et al. | |
| 2020/0333431 | A1 * | 10/2020 | Volkel | H01Q 15/0086 |
| 2021/0091908 | A1 * | 3/2021 | Gwinn, IV | H01Q 21/293 |

* cited by examiner

RADIATION PATTERN RECONFIGURABLE ANTENNA

BACKGROUND

This disclosure is generally directed to radio detection and ranging (radar) sensing and in particular to antennas utilized in radar sensing.

Radar sensing systems are utilized in a number of applications. In particular, recent pushes towards more autonomous vehicles have resulted in radar sensing systems being increasingly installed on vehicles. Depending on the field of view desired, a radar sensing system may include a plurality of separate antennas, each providing a different radiation pattern and therefore a different field of view. The inclusion of a plurality of separate antennas represents an additional cost. It would be beneficial to provide a radar sensing system that can provide various field of views while minimizing the cost of the system.

SUMMARY

According to one aspect, a reconfigurable antenna includes an input port, a signal divider, a filter, and first and second radiators. The signal divider is connected to the input port and configured to divide a signal at the input port into a first output and a second output. The filter is connected to the second output, wherein the filter is configured to filter signal within a first frequency band and to pass signals within a second frequency band. The first radiator is configured to receive the signal from the first output of the signal divider, wherein the first radiator receives signals within the first frequency band and the second frequency band. The second radiator is connected to the filter to receive signals provided within the second frequency band.

According to some aspects, a radio detection and ranging (radar) sensor includes a transmitting antenna, a receiver antenna, a radar transceiver, and a control and signal processing circuit. The radar transceiver is configured to provide an RF signal to the transmitting antenna for transmission and to receive RF signals from the receiving antenna. The control and signal processing circuit utilizes the received RF signals to detect objects and/or providing ranging. At least one of the transmitting antenna and receiving antenna is a reconfigurable antenna that provides a first radiation pattern within a first frequency band and a second radiation pattern within a second frequency band. The reconfigurable antenna includes an RF input/output port, an RF divider, an RF filter, and at least first and second RF radiators. The RF divider is connected to the RF input/output port and includes at least first and second RF outputs. The RF filter is connected to the second RF output, wherein the RF filter is configured to filter RF signals in the first frequency band and to pass RF signals in the second frequency band. The first RF radiator is connected to the first RF output of the RF signal divider, wherein the first radiator receives/transmits RF signals provided in both the first frequency band and the second frequency band. The second RF radiator is connected to the RF filter to receive/transmit RF signals provided in the second frequency band.

According to another aspect, a method of generating different radiation patterns using a radiation pattern reconfigurable antenna having a single input port includes applying a signal having a first frequency to the input port of the reconfigurable antenna to generate a first radiation pattern and applying a signal having a second frequency to the input port of the reconfigurable antenna to generate a second radiation pattern, wherein the first radiation pattern is wider than the second radiation pattern.

DETAILED DESCRIPTION

According to some aspects, this disclosure is directed to a radar sensing system that utilizes a radiation pattern reconfigurable antenna have two or more modes of operation selected based on the frequency of the signal provided at the input. In some embodiments, the reconfigurable antenna includes at least a first radiator and a second radiator adjacent to the first radiator. In response to a signal received at a first frequency, the signal is applied only to the first radiator and generates in response a first radiation pattern. In response to a signal received at a second frequency, the signal is applied to both the first radiator and the second radiator which generate in response a second radiation pattern different than the first radiation pattern. In some embodiments, the first radiation pattern is wider than the second radiation pattern. In some embodiments, a filter is utilized to selectively apply the signal to the second radiator based on the frequency of the received signal.

Figure 1:
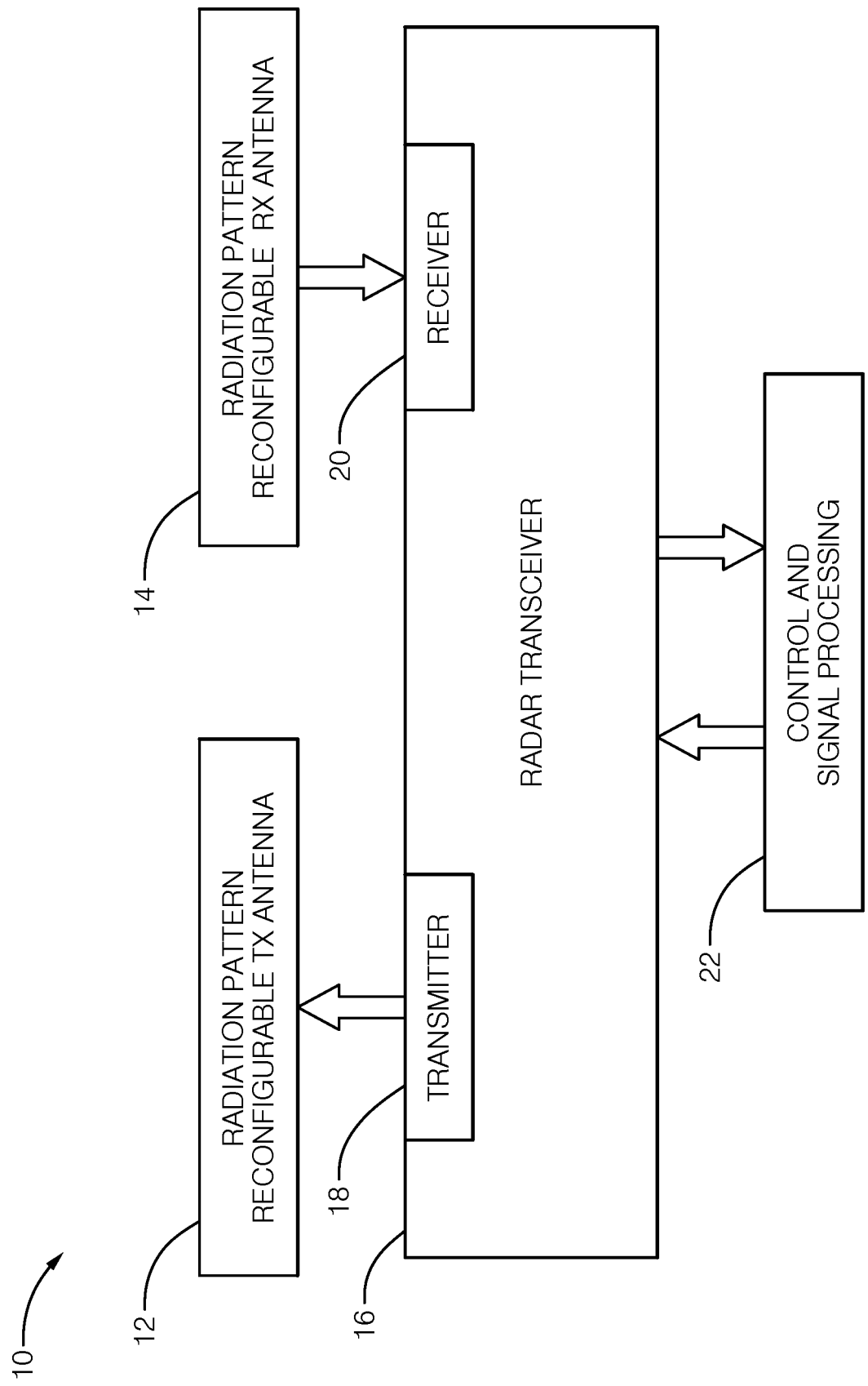
FIG. 1 is a top view/block diagram of a radio detection and ranging (RADAR) sensing system according to some embodiments.

FIG. 1 is a top view/block diagram of a radio detection and ranging (Radar) sensor 10 according to some embodiments. Radar sensor 10 includes a radiation pattern reconfigurable transmission (TX) antenna 12 (hereinafter "reconfigurable TX antenna 12"), a radiation pattern reconfigurable receiving (RX) antenna 14 (hereinafter "reconfigurable RX antenna 14"), a radar transceiver 16 that includes a transmitter 18 and a receiver 20, and a control and signal processing circuit 22. In some embodiments, radar sensor 10 is implemented on a monolithic microwave integrated circuit (MMIC), which allows the signals received by the reconfigurable RX antenna 14 to be processed on-board. In other embodiments, one or more of the components associated with radar sensor 10 may be implemented as standalone components.

During operation, the radar transceiver 16 generates a transmission signal (e.g., radio frequency (RF) signal) that is communicated to reconfigurable TX antenna 12 for transmission of radio waves (referred to herein as an RF signal) in a particular direction. As discussed in more detail below, the radiation pattern of reconfigurable TX antenna 12 is configurable based on the frequency of the RF signal received as an input to reconfigurable TX antenna 12. The RF signal reflects from one or more targets and the reflected RF signal is received by the reconfigurable RX antenna 14 (likewise configurable based on the frequency of the reflected RF signal). The radar transceiver converts the RF signals to electrical signals that are then processed by control and signal processing circuit 22 to perform operations such as detecting and ranging of objects. In some embodiments, the radar sensor 10 may include a plurality of transmit channels, wherein one or more of the transmit channels are connected to reconfigurable TX antenna(s) 12 as well as a plurality of receiving channels, wherein one or more of the receive channels are connected to reconfigurable RX antenna(s) 14. This type of system is referred to as a Multiple-Input-Multiple-Output (MIMO) system.

In some embodiments the reconfigurable TX antenna 12 provides two modes of operations determined by the frequency of the RF input signal. A first mode of operation is provided by applying an RF input to the reconfigurable TX antenna 12 having a first frequency. The second mode of operation is provided by applying an RF input to the reconfigurable TX antenna 12 having a second frequency. In the first mode, the reconfigurable TX antenna 12 generates an RF output having a first radiation pattern. In the second mode, the reconfigurable TX antenna 12 generates an RF output having a second radiation pattern. In some embodiments, the first radiation pattern is wider than the second radiation pattern. The wide radiation pattern provides a wider field-of-view for the radar sensor 10, but at the expense of reduced antenna peak gain. The narrower radiation pattern provides a narrower field-of-view for the radar sensing system 10 but provides increased antenna peak gain as compared to the wider radiation pattern. In general, increasing the peak gain of the antenna increases the detection range of objects. A benefit of the reconfigurable TX antenna 12 is that the radiation pattern can be modified by modifying the frequency of the input RF signal. In some embodiments, the RX antenna 14 has the same architecture as the radiation pattern reconfigurable TX antenna 12 (i.e., reconfigurable in response to frequency of the RF signal). In a first mode, the reconfigurable RX antenna 14 receives RF signals (i.e., reflected RF signals) in a first radiation pattern (i.e., field of view). In a second mode, the reconfigurable RX antenna 14 receives RF signals in a second radiation pattern, wherein the radiation pattern selected is based on the frequency of the received RF signals. In some embodiments, the first radiation pattern is wider than the second radiation pattern and provides a wider field-of-view for the radar sensor 10.

In some embodiments, control and signal processing circuit 22 selects the frequency of the RF input provided to reconfigurable TX antenna 12. In some embodiments, the control and signal processing circuit 22 selectively switches or modulates the frequency of the RF input provided to the reconfigurable TX antenna 12 between the first frequency and the second frequency to provide a radiation pattern that modulates between a wide field of view and a narrow field of view.

In some embodiments, the radar sensor 10 is implemented on a vehicle to provide detection and ranging of nearby objects. For example, in some embodiments the radar sensor 10 is installed looking forward of the vehicle, wherein the second mode of operation—providing a relatively narrow radiation pattern—is oriented in front of the vehicle to detect objects in front of the vehicle. During the first mode of operation, the relatively wider radiation pattern detects objects not only in front of the vehicle but to the side as well. By modulating the frequency of the RF signal provided to the reconfigurable TX antenna 12, the radiation pattern of the radar sensor 10 can be modulated to detect objects directly in front of the vehicle at larger distances while also detecting objects located at least partially to one side of the vehicle at closer distances. In other embodiments, radar sensor 10 may be installed on the side and/or rear of the vehicle, wherein the radiation pattern is selectively modified to select the desired antenna gain and field of view of the transmitting and/or receiving antennas.

Figure 2A:
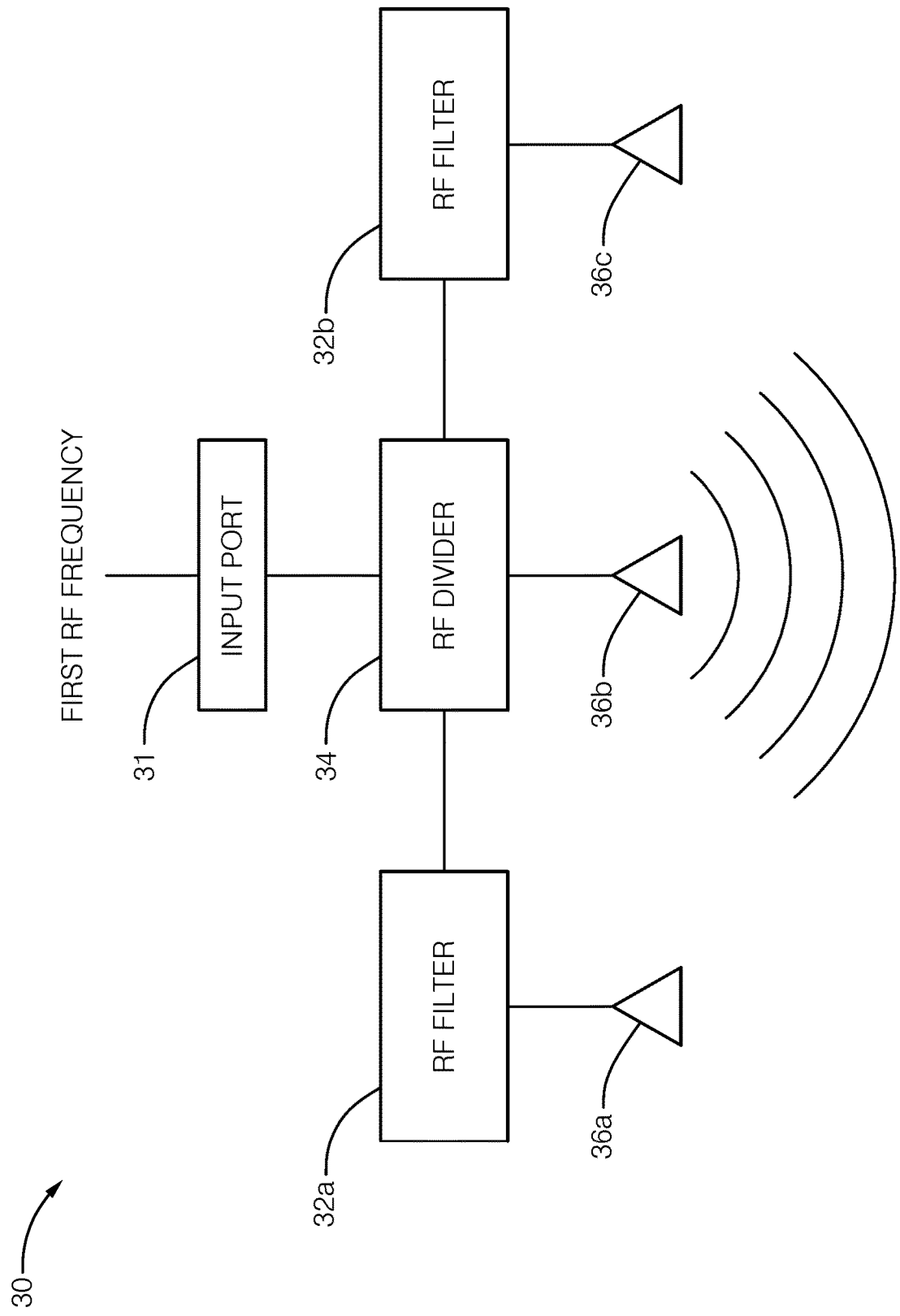
FIGS. 2a and 2b are block diagrams of a radiation pattern reconfigurable dual mode antenna operating in a first mode and a second mode, respectively, according to some embodiments.
Figure 2B:
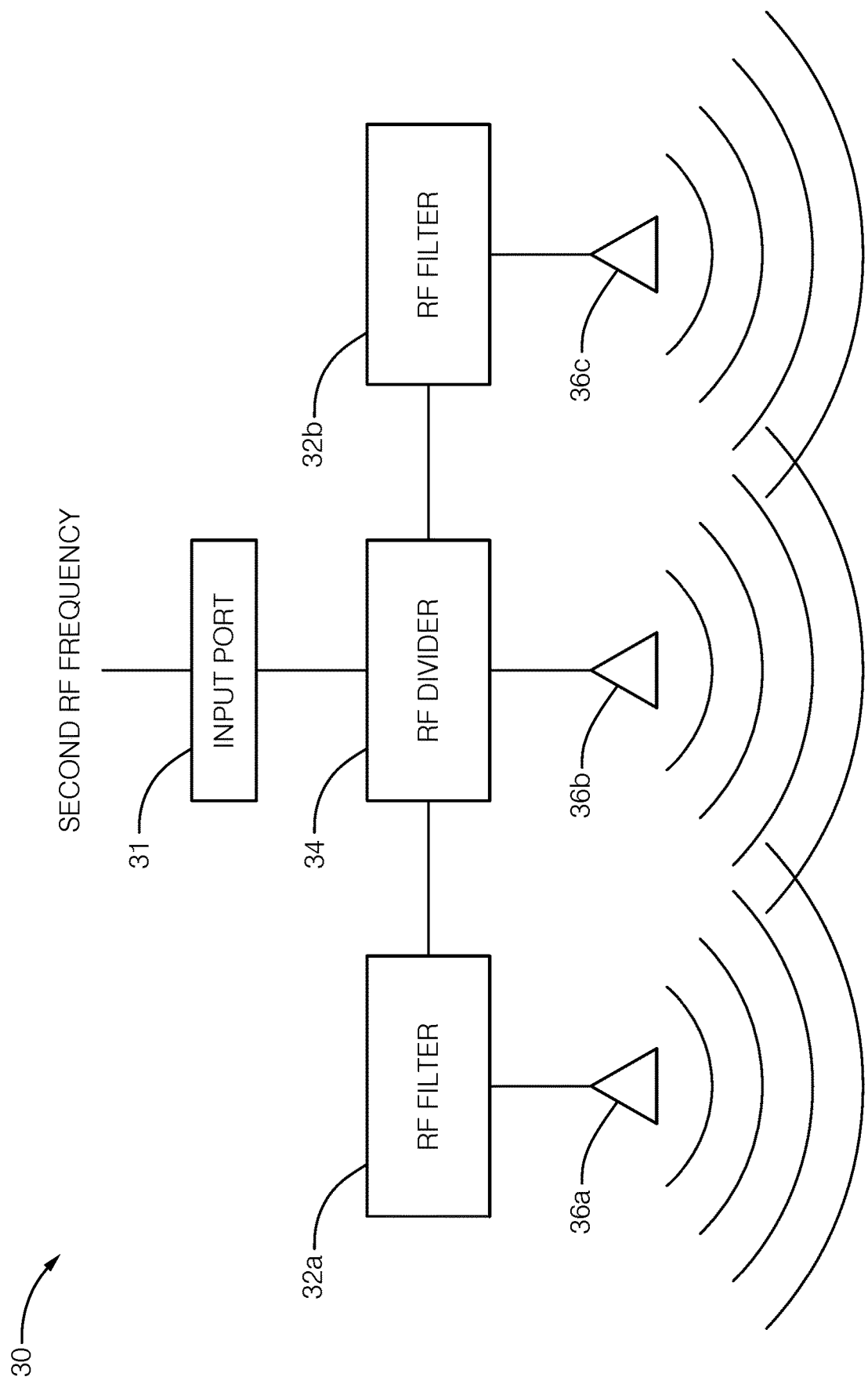

FIGS. 2*a* and 2*b* are block diagrams of a radiation pattern reconfigurable dual mode antenna operating in a first mode and a second mode, respectively, according to some embodiments. The radiation pattern reconfigurable dual mode antenna 30 shown in FIGS. 2*a* and 2*b* includes RF input port 31, first and second RF filters 32*a* and 32*b*, RF divider 34, and a plurality of RF radiators 36*a*, 36*b*, and 36*c*. FIG. 2*a* illustrates application of a first frequency to the reconfigurable dual mode antenna 30 (first mode) and FIG. 2*b* illustrates application of a second frequency to the reconfigurable dual mode antenna 30 (second mode). In the embodiment discussed in FIGS. 2*a*-2*b*, as well as throughout, the signals provided to the respective antennas are described as radio frequency (RF) signals, but in other embodiments the same principles may be applied to signals at other frequencies. In this embodiment, the reconfigurable dual mode antenna 30 is described as a transmitter, but in other embodiments the same configuration of components could be utilized to operate the reconfigurable antenna as a receiver. As described in more detail below, when operating as a transmitting the RF divider 34 divides an input RF signal into a plurality of RF signals selectively provided to the plurality of RF radiators 36*a*, 36*b*, and 36*c*. Conversely, when operating as a receiver, the RF divider 34 operates instead as an RF combiner that operates to combine the RF signals provided by each of the plurality of RF radiators 36*a*, 36*b*, 36*c* (operating as receivers) and provides a combined RF output to the RF input port 31 (utilized here as an output port). For the sake of simplicity, the reconfigurable antennas are described operating as transmitters, but it should be understood that with respect to each embodiment described below the reconfigurable antennas could operate as a receiver.

The RF signal received at the input port 31 is provided to the RF divider 34. In the embodiment shown in FIGS. 2*a* and 2*b*, RF divider 34 is a 1-to-3 divider, in which the RF input is divided into three RF outputs. In this example, two of the RF outputs are provided to RF filters 32*a* and 32*b*, respectively, while the third RF output is provided—without filtering—to RF radiator 36*b*. The filtered RF output of RF filters 32*a* and 32*b* are provided to RF radiators 36*a* and 36*c*, respectively. The RF filters 32*a* and 32*b* act to filter RF signals within a first frequency band or bands and to pass RF signals to RF radiators 36*a* and 36*c* in a second frequency band or bands. The RF filters 32*a* and 32*b* operate like a switch, selectively applying an RF signal to RF radiators 36a and 36c based on the frequency of the RF signal.

FIG. 2a illustrates operation in the first mode in response to an RF signal provided at the input that is within the frequency band filtered by RF filters 32a and 32b, resulting in the RF signal being applied only to the RF radiator 36b. In this way, RF radiator 36b is described as "ON", while RF radiators 36a and 36c are "OFF". The resulting radiation pattern generated by the reconfigurable dual mode antenna 30 is a product only of the RF signal provided to RF radiator 36b.

FIG. 2b illustrates operation in the second mode in response to an RF signal provided at the input that is within the frequency band passed by RF filters 32a and 32b, resulting in the RF signal being applied to each of the RF radiators 36a, 36b, and 36c (i.e., each RF radiator 36a, 36b, and 36c is "ON"). The resulting radiation pattern generated by the reconfigurable dual mode antenna 30 is a product of the interaction of RF signals generated by RF radiators 36a, 36b, and 36c. In some embodiments, the radiation pattern generated during operation in the first mode is wider than the radiation pattern generated during operation in the second mode. In some embodiments, width of the radiation pattern is measured in the azimuth plane, but in other embodiments may be measured in the vertical plane.

Figure 3:
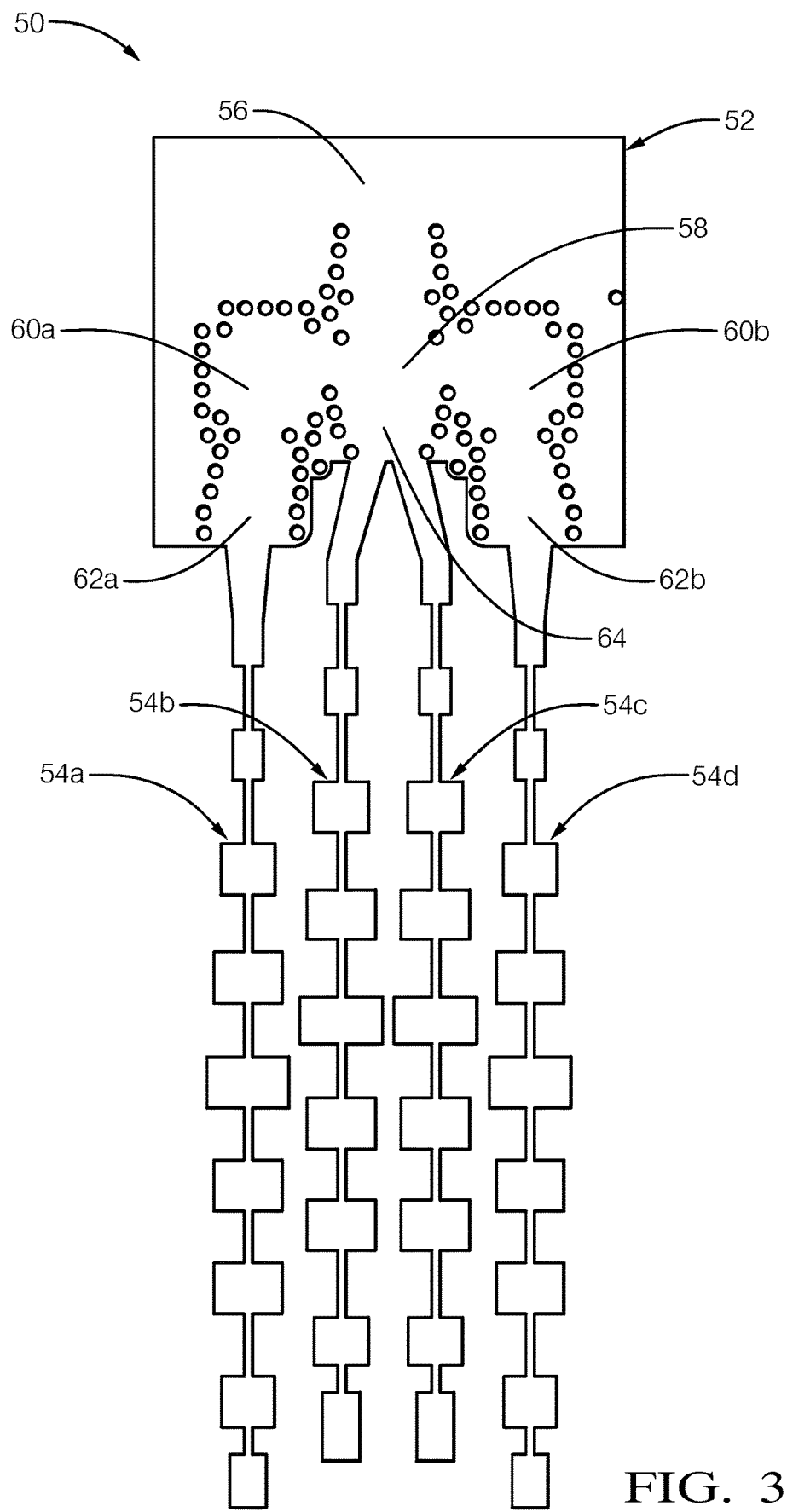
FIG. 3 is a top view of a two-mode radiation pattern reconfigurable antenna according to some embodiments.

Referring to FIG. 3, a top view of a two-mode radiation pattern reconfigurable antenna 50 is provided according to some embodiments. As shown in FIG. 3, the reconfigurable antenna 50 includes a substrate integrated waveguide (SIW) feed network 52 and a plurality of RF radiators 54a, 54b, 54c, and 54d. The SIW feed network 52 is fed by a SIW transmission line input 56. The SIW feed network 52 includes a one-to-three power divider 58, first and second RF filters 60a, 60b, first and second SIW delay lines 62a, 62b, and middle SIW delay line 64. In some embodiments, RF radiators 54a, 54b, 54c, and 54d are microstrip patch antenna sticks. In other embodiments, the RF radiators 54a, 54b, 54c, and/or 54d may be implemented with other type of antennas, such as SIW slot antennas. In some embodiments, the RF radiators 54a, 54b, 54c, and/or 54d may be a single RF radiator element, a linear antenna array, and/or a planar antenna array.

In the embodiment shown in FIG. 3, the one-to-three power divider 58 receives an RF signal at a particular frequency. The one-to-three power divider 58 receives the RF signal and provides the RF signal to the first and second RF filters 60a, 60b and to the middle SIW delay line 64. In some embodiments, the RF filters 60a, 60b have the same attributes (i.e., filter the same frequency band(s), pass the same frequency band(s)). In some embodiments, the RF filters 60a, 60b are band-pass filters, but in other embodiments other types of filters may be utilized (e.g., low-pass filter, high-pass filter, etc.). In some embodiments, the RF filters 60a, 60b are SIW cavity-type RF filters. The RF filters 60a, 60b are connected via first and second SIW delay lines 62a, 62b to RF radiators 54a and 54d. The reconfigurable antenna 50 operates in the first mode when the frequency of the RF input is within the frequency band filtered by RF filters 60a, 60b, such that the RF signal is provided only to RF radiators 54b and 54c (only RF radiators 54b and 54c are ON). The reconfigurable antenna 50 operates in the second mode when the frequency of the RF input is within the frequency band passed by RF filters 60a, 60b, such that the RF signal is provided to RF radiators 54a, 54b, 54c, and 54d (such that each RF radiator 54a-54d is ON). As describe above, the purpose of the RF filters 60a, 60b are to act as switches to allow RF signals to be provided to the RF radiators 54a and 54d at one frequency and to prevent the RF signals from being provided to the RF radiators 54a and 54d at another frequency.

In some embodiments, the first and second delay SIW lines 62a, 62b and middle SIW delay line 64 are selected to compensate for phase differences introduced by the first and second RF filters 60a, 60b to ensure excitation (at least within the second mode of operation) of RF radiators 54a, 54b, 54c, and 54d in phase with one another. By exciting each RF radiator 54a-54d at the same time or in phase with one another, the radiation pattern is focused towards the boresight (represented as 0° in FIG. 4a). In some embodiments, the length of first and second delay SIW lines 62a, 62b and/or middle SIW delay line 64 is modified in order to control the phase of the RF signal between the RF radiators 54a, 54b, 54c, and 54d. In this way, in some embodiments the second mode of operation can be utilized to generate other shapes in the radiation pattern (either within the azimuth plane or elevation plane).

Figure 4A:
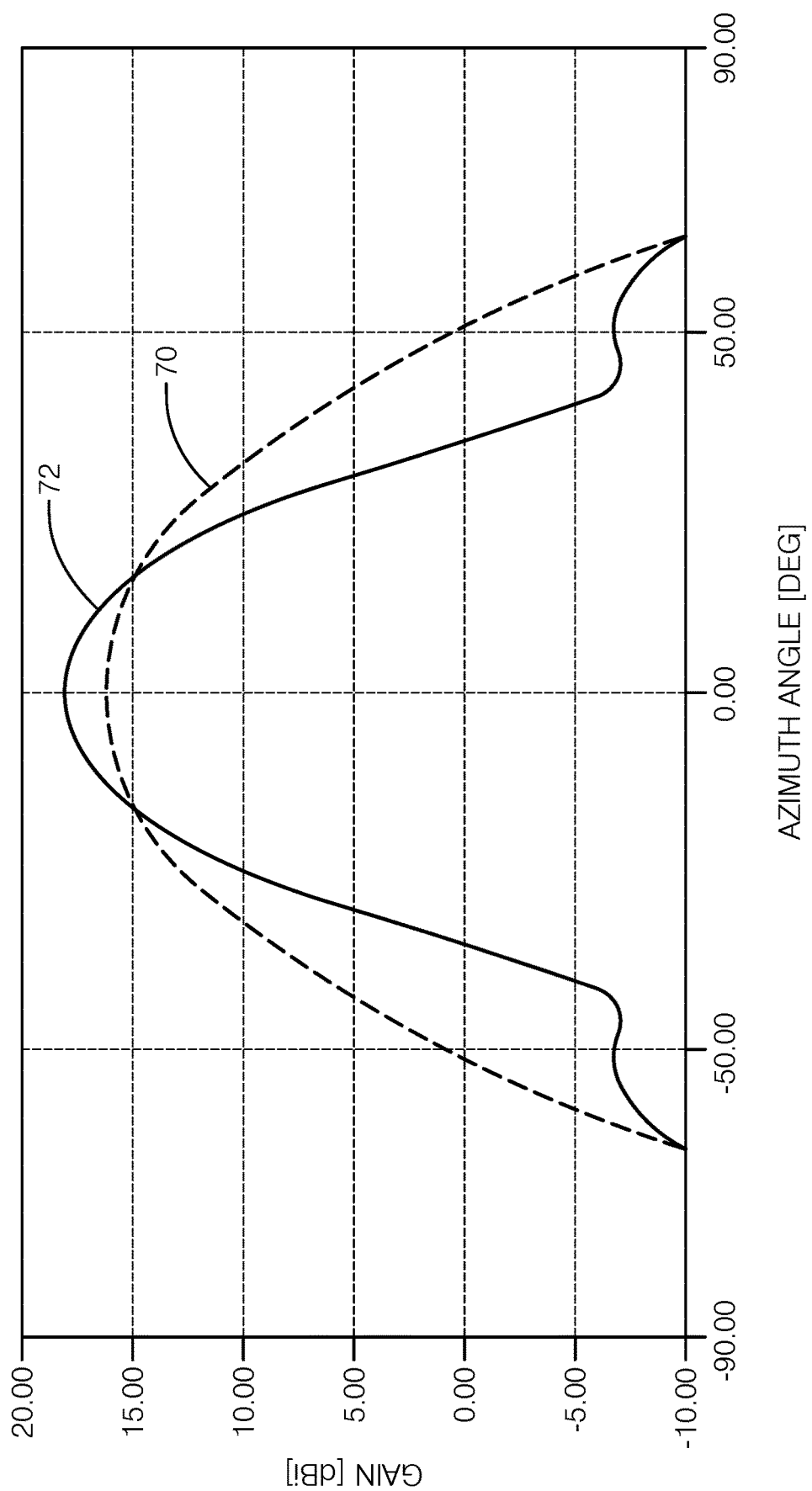
FIG. 4a is an antenna gain graph that illustrates the azimuth angle gain of the radiation pattern reconfigurable antenna shown in FIG. 3 in both the first mode and the second mode of operation according to some embodiments.

FIG. 4a is an antenna gain graph that illustrates the azimuth angle gain of the radiation pattern reconfigurable antenna shown in FIG. 3 in both the first mode (line 70) and the second mode (line 72) of operation according to some embodiments. In the first mode, the RF signal (having a first frequency) is provided only to RF radiators 54b and 54c. The resulting radiation pattern is illustrated by line 70 and is characterized by a relatively wide radiation pattern as compared with line 72. In the second mode, the RF signal (having a second frequency, different from the first frequency) is provided to RF radiators 54a, 54b, 54c, and 54d. The resulting radiation pattern is illustrated by line 72 and is characterized by a relatively narrow radiation pattern as compared with line 70.

Figure 4B:
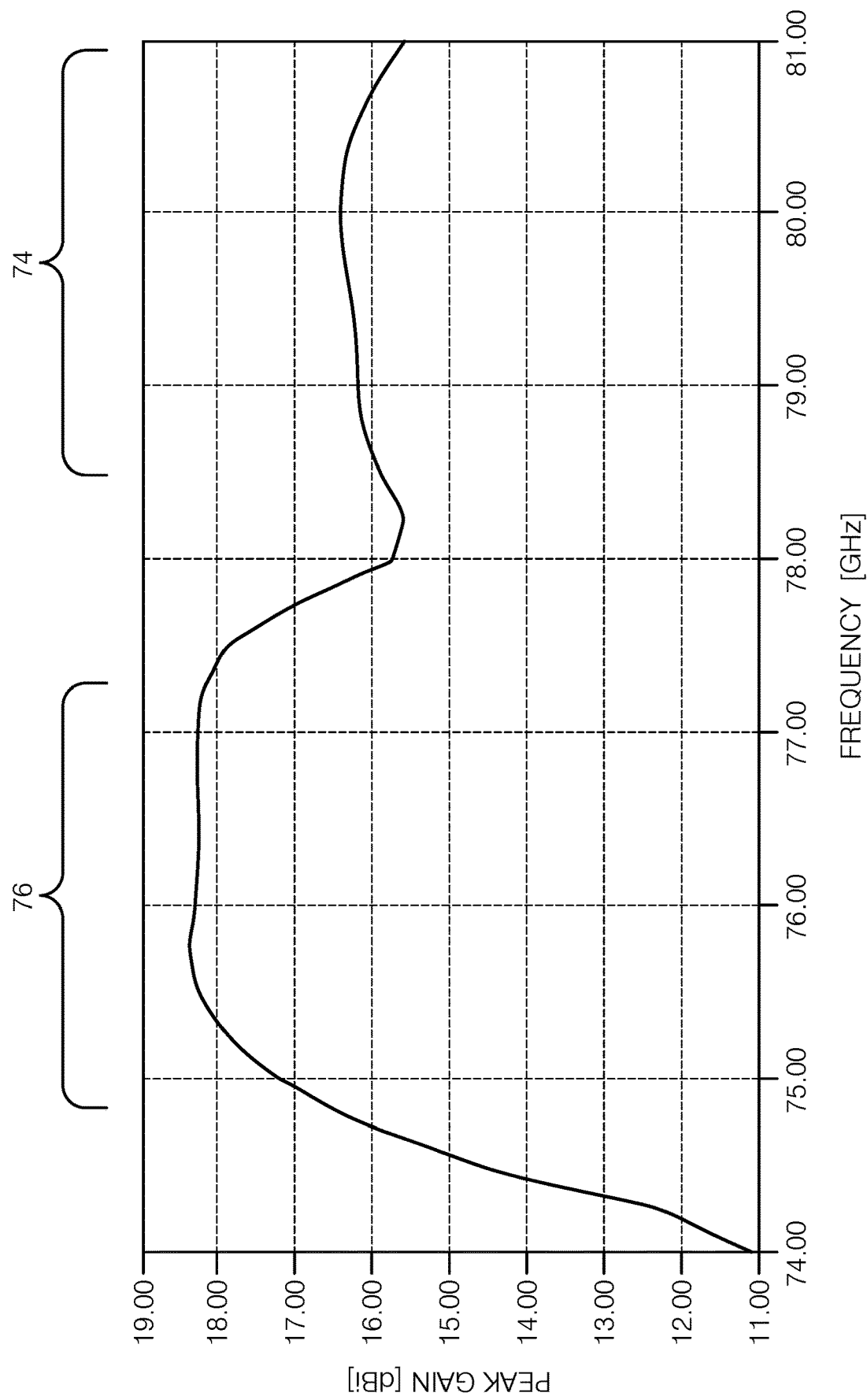
FIG. 4b is a peak antenna gain graph that illustrates the peak gain of the radiation pattern reconfigurable antenna shown in FIG. 3 for various frequencies according to some embodiments.

FIG. 4b is a peak antenna gain graph that illustrates the peak gain of the radiation pattern reconfigurable antenna shown in FIG. 3 for various frequencies according to some embodiments. Operation in the first mode is characterized by a RF signal in the frequency band within 78 GHz and 81 Ghz (labeled 74). Operation in the second mode is characterized by a RF signal in the frequency band within 75 GHz and 77 GHz (labeled 76). As shown in FIG. 4b, the antenna peak gain is higher in the lower frequencies and lower at the higher frequencies.

Figure 5:
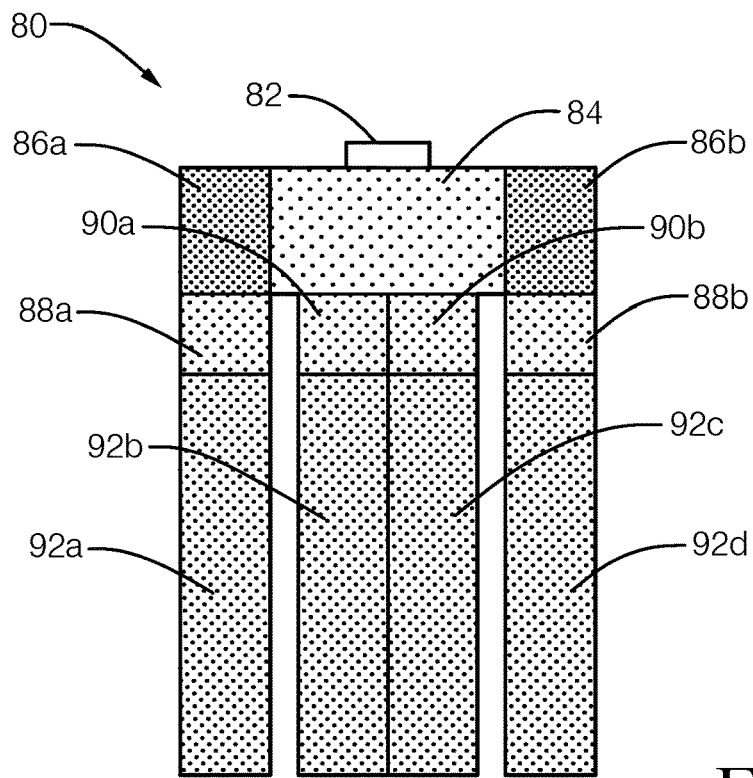
FIG. 5 is an antenna design topology of a radiation pattern reconfigurable antenna according to some embodiments.
Figure 6:
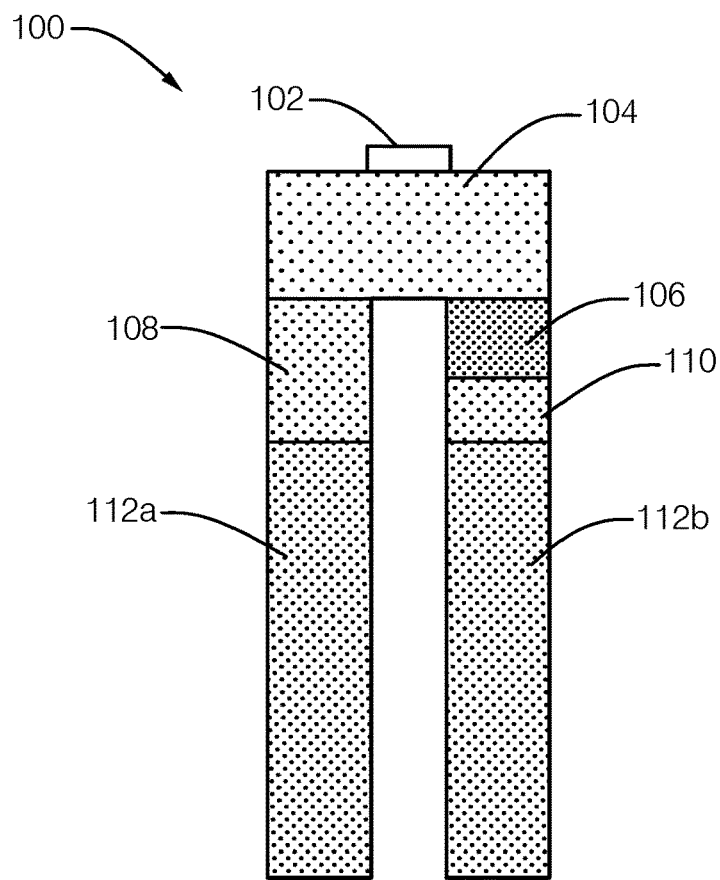
FIG. 6 is an antenna design topology of a radiation pattern reconfigurable antenna according to some embodiments.
Figure 7:
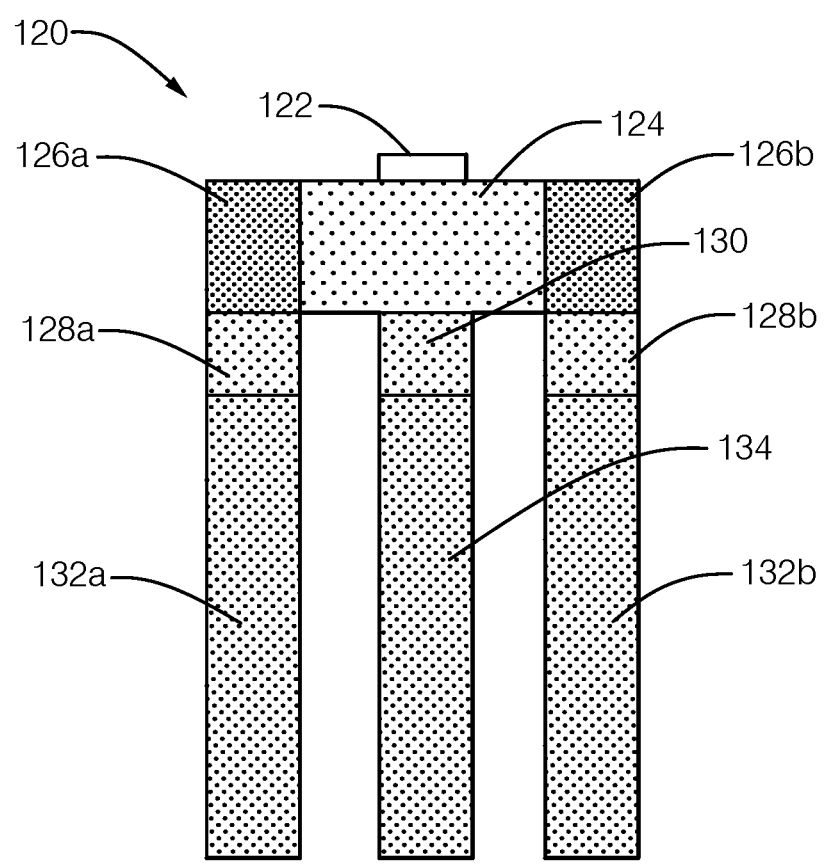
FIG. 7 is an antenna design topology of a radiation pattern reconfigurable antenna according to some embodiments.

Referring now to FIGS. 5-7, various topologies of reconfigurable antennas are shown. In each of the topologies illustrates, the reconfigurable antennas shown may be implemented using a substrate integrated waveguide (SIW) feed network (as described with respect to FIG. 3). In other embodiments, the reconfigurable antenna may be implemented using one or more of a microstrip feed network, coplanar waveguide feed network, air-filled SIW (air waveguides), etc. Likewise, the antennas utilized in each embodiment may be implemented using microstrip patch antennas, SIW slot antennas, and may be further implemented using single antenna, linear antenna arrays, and/or planar antenna arrays.

FIG. 5 illustrates a reconfigurable antenna 80 which includes an RF input port 82, a one-to-four RF divider 84, first and second RF filters 86a, 86b, first and second delay lines 88a, 88b, third and fourth delay lines 90a, 90b, and a plurality of RF radiators 92a, 92b, 92c, and 92d. In some embodiments, the reconfigurable antenna 80 operates in either a first mode or a second mode based on the frequency of the RF signal provided. In this embodiment, first and second RF filters 86a, 86b operate to filter RF signals in a first frequency band and to pass RF signals in a second frequency band. In other embodiments, first RF filter 86a may select frequencies in a first frequency band and second RF filter 86b may select frequencies in a second frequency band. In this embodiment, three modes of operation are possible, a first mode in which RF radiators 92b and 92c are ON (i.e., RF filters 86a, 86b filter the RF signal so that radiators 92a and 92d do not receive an RF signal), a second mode in which RF radiators 92b and 92c are ON along with one of radiators 92a or 92d, and a third mode in which each of the radiators 92a-92d are ON. Based on the selection of which radiators 92a-92d are turned ON, various radiation patterns may be selected. In some embodiments, the first mode—in which only RF antennas 92b and 92c are ON— provides a wider radiation pattern than other modes in which additional radiators are turned ON.

In some embodiments, the distance between each of the plurality of RF radiators 92a-92d is equal. In other embodiments, the distance between each of the plurality of RF radiators 92a-92d may be selected to steer or control the geometry of the radiation pattern. In addition, in some embodiments the RF radiator configured to always receive the RF signal is located in center of the plurality of radiators. However, in other embodiments the position of the RF radiator that receives the RF signal may be varied among the possible positions.

In addition, in some embodiments the first and second delay lines 88a, 88b and third and fourth delay lines 90a, 90b are selected so that the RF signals applied to the plurality of RF radiators 92a-92d are in phase with one another. However, in other embodiments the length of the first and second delay lines 88a, 88b, and/or third and fourth delay lines 90a, 90b can be modified in order to control the phase of the RF signal between the plurality of RF radiators 92a-92d. In this way, in some embodiments the second (and/or third) mode of operation can be utilized to steer the radiation pattern.

FIG. 6 illustrates a reconfigurable antenna 100 which includes an RF input port 102, a one-to-two RF divider 104, RF filter 106, first delay line 108, second delay line 110, and first and second RF radiators 112a, 112b. In some embodiments, the reconfigurable antenna 100 operates in either a first mode or a second mode based on the frequency of the RF signal provided. In the first mode, the RF filter 106 filters the RF signal so that only RF radiator 112a is ON. In the second mode, the RF filter 106 passes the RF signal so that both RF radiators 112a and 112b are ON. The first mode—in which only RF radiator 112a is ON—provides a wider radiation pattern than the second mode in which both RF radiators 112a and 112b are ON. Once again, the first delay line 108 and/or second delay line 110 may be selected to control the phase of the RF signals applied to the respective antennas. In some embodiments, it may be desirable to ensure that the RF signals are applied to RF radiators 112a, 112b in phase with one another. In other embodiments, the radiation pattern may be steered by modifying the phase relationship between the RF signals applied to the first and second RF radiators 112a, 112b.

FIG. 7 is an antenna design topology of a radiation pattern reconfigurable antenna 120 according to some embodiments. In some embodiments, the reconfigurable antenna 120 includes an RF input port 122, a one-to-three RF divider 124, first and second RF filters 126a and 126b, first and second delay lines 128a and 128b, middle delay line 130, first and second RF radiators 132a, 132b, and middle RF radiator 134. In the embodiment shown in FIG. 7, the one-to-three RF divider 124 receives an RF signal at a particular frequency. The one-to-three RF divider 124 receives the RF signal and provides the RF signal to the first and second RF filters 126a, 126b and the middle RF radiator 134 via middle delay line 130. The reconfigurable antenna 120 operates in a first mode when the frequency of the RF input is within the frequency band filtered by RF filters 126a, 126b, such that the RF signal is provided only to middle RF radiator 134. The reconfigurable antenna 120 operates in the second mode when the frequency of the RF input is within the frequency band passed by RF filters 126a, 126b, such that the RF signal is provided to first and second RF radiators 132a, 132b and middle RF radiator 134. As describe above, the purpose of the RF filters 126a, 126b are to act as switches to allow RF signals to be provided to the outer RF radiators 132a and 132b at one frequency and to prevent the RF signals from being provided to these RF radiators at another frequency. In some embodiments, the first and second RF radiators 132a, 132b that are selectively turned ON and OFF are located on opposite sides of the middle RF radiator 134. However, in other embodiments the position of the plurality of RF radiators 132a, 132b and 134 may be modified (e.g., RF radiator 134 may be located in an outside position). In some embodiments, the distance between middle RF radiator 134 and first and second RF radiators 132a, 132b is the same. In some embodiments, the distance between the middle RF radiator 134 and the first RF antenna 132a is greater than or less than the distance between the middle RF antenna 134 and the second RF antenna 132b.

In addition, the first and second delay lines 128a and 128b and middle delay line 130 are selected so that the RF signals applied to the plurality of RF radiators 132a, 132b and 134 are in phase with one another. However, in other embodiments the length of the first and second delay lines 128a, 128b, and/or middle delay line 130 can be modified in order to control the phase of the RF signal between the plurality of RF radiators 132a, 132b and middle RF radiator 134. Selective control or modification of the delay lines allows the radiation pattern to be steered within the second mode of operation. This is illustrated in the antenna gain graph provided in FIG. 8.

Figure 8:
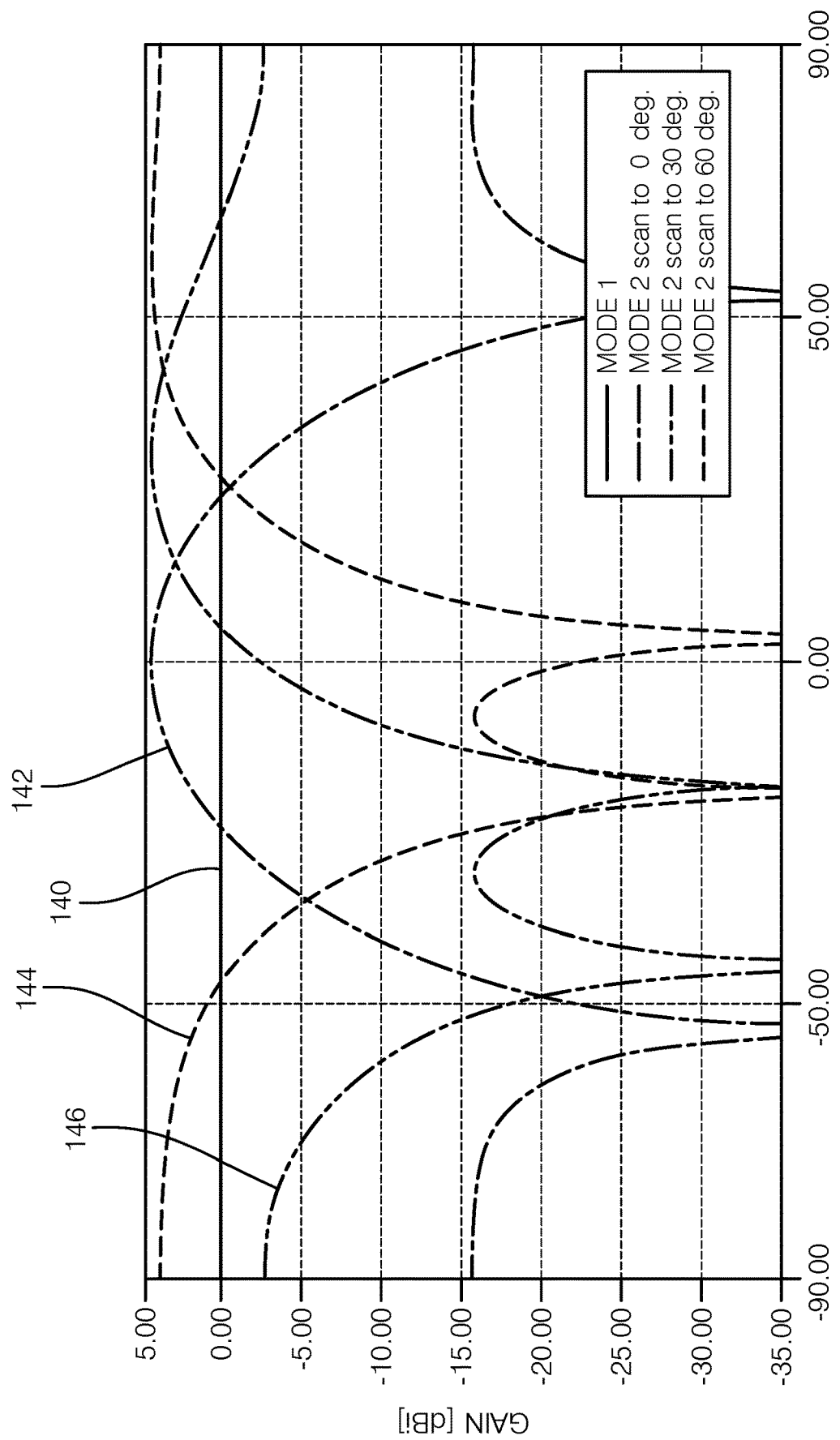
FIG. 8 is an antenna gain graph that illustrates the azimuth angle gain of the radiation pattern reconfigurable antenna shown in FIG. 5 in various modes of operation according to some embodiments.

FIG. 8 is an antenna gain graph that illustrates the azimuth angle gain of the radiation pattern reconfigurable antenna shown in FIG. 5 in various modes of operation according to some embodiments. In the first mode, the RF signal is applied only to the middle RF radiator 134 and the radiation pattern (shown by line 140) is very wide, extending from −90° to 90°. In the second mode, the RF signal is applied to both the middle RF radiator 134 and the first and second RF radiators 132a, 132b. As shown in FIG. 8, the radiation pattern generated in the second mode in which the RF signals are in phase with one another provides a radiation pattern (shown by line 142) that is narrower than the radiation pattern in the first mode. In addition, by modifying the lengths of the first and second delay lines 128a, 128b and/or the length of middle delay line 130 the radiation pattern can be steered as illustrated by lines 144 and 146. In particular, line 144 illustrates the radiation pattern generated in response to the RF signal provided to the first and second RF radiators 132a, 132b being out of phase with the RF signal applied to RF radiator 134 to form a beam that focuses radiation energy at an angle of approximately 30°. Line 146 illustrates the radiation pattern generated in response to the RF signal provided to the first and second RF radiators 132a, 132b being out of phase with the RF signal applied to RF radiator 134 to form a beam that focuses radiation energy at an angle of approximately 60°. In other embodiments, first and second delay lines 128a, 128b have different lengths, resulting in the RF signal applied to first and second antennas 132a and 132b being out of phase with one another as well as out of the phase with the RF signal applied to the middle RF radiator 134.

Figure 9:
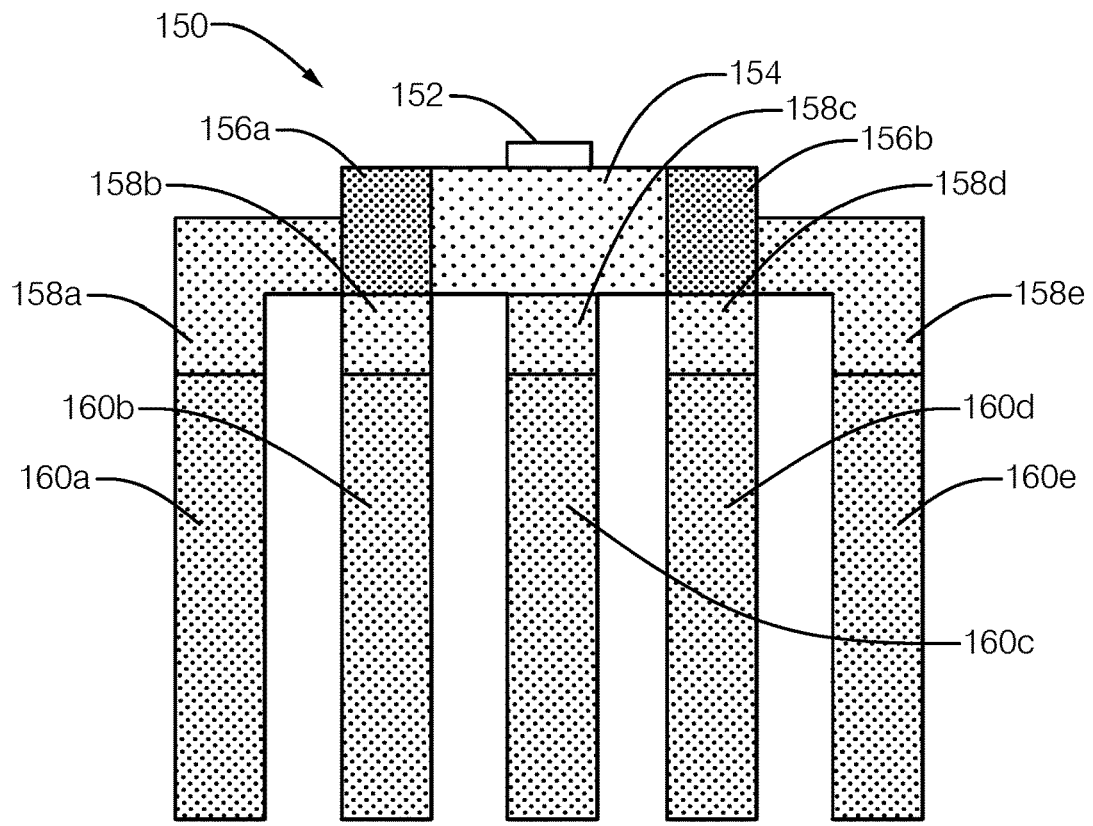
FIG. 9 is an antenna design topology of a radiation pattern reconfigurable antenna according to some embodiments.

FIG. 9 is an antenna design topology of a radiation pattern reconfigurable antenna 150 according to some embodiments. In some embodiments, the reconfigurable antenna 150 includes an RF input port 152, a one-to-five RF divider 154, first and second RF filters 156a and 156b, a plurality of delay lines 158a-158e, and a plurality of RF radiators 160a, 160e. In the embodiment shown in FIG. 9, the one-to-five RF divider 154 receives an RF signal at a particular frequency. The one-to-five RF divider 154 receives the RF signal and provides the RF signal to the first and second RF filters 156a, 156b and at least one of the RF antennas (e.g., RF antenna 160c) via one of the delay lines (e.g., RF delay line 158c). The reconfigurable antenna 150 operates in a first mode when the frequency of the RF input is within the frequency band filtered by RF filters 156a, 156b, such that the RF signal is provided only to the at least one RF radiator (e.g., RF radiator 160c). The reconfigurable antenna 150 operates in the second mode when the frequency of the RF input is within the frequency band passed by RF filters 156a, 156b, such that the RF signal is provided to each of the plurality of RF radiators 160a-160e. As describe above, the purpose of the RF filters 156a, 156b are to act as switches to allow RF signals to be provided to the additional RF radiators (e.g., RF radiators 160a, 160b, 160d, and 160e) at one frequency and to prevent the RF signals from being provided to these antennas at another frequency. In some embodiments, the plurality of RF radiators 160a, 160b, 160d, and 160e that are selectively turned ON and OFF are located symmetrically on either side of the RF radiator (e.g., RF radiator 160c) that always receives an RF signal. In some embodiments, the distance between each of the plurality of RF radiators 160a-160e is equal. In other embodiments, the distance between one or more of the RF radiators 160a-160e may be unequal in order to vary the radiation pattern as desired.

Figure 10:
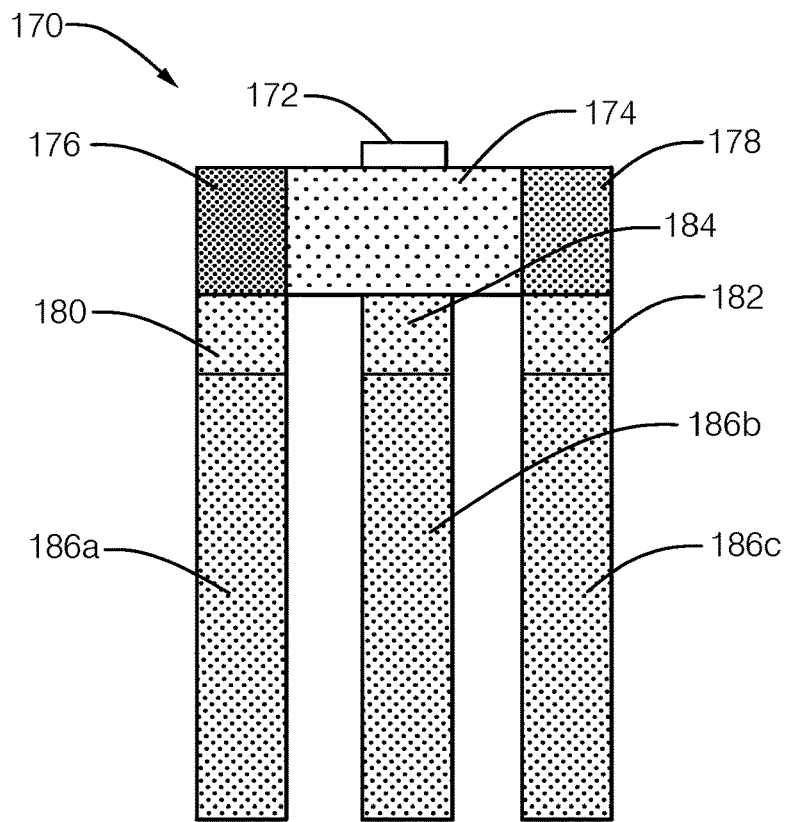
FIG. 10 is an antenna design topology of a radiation pattern reconfigurable antenna according to some embodiments.

FIG. 10 is an antenna design topology of a radiation pattern reconfigurable antenna 170 according to some embodiments. In some embodiments, the reconfigurable antenna 170 includes an RF input port 172, a one-to-three RF divider 174, first RF filter 176 and second RF filter 178, a plurality of delay lines 180, 182, and 184, and a plurality of RF radiators 186a, 186b, and 186c. In the embodiment shown in FIG. 9, the one-to-three RF divider 174 receives an RF signal at a particular frequency. The one-to-three RF divider 174 receives the RF signal and provides the RF signal to the first and second RF filters 176 and 178. In the embodiment shown in FIG. 10, the range of frequencies passed by first RF filter 176 may differ from the range of frequencies passed by the second RF filter 178. First RF filter 176 is connected to first RF radiator 186a via delay line 180. Second RF filter 178 is connected to third RF radiator 186c via delay line 182. In addition, second RF radiator 186b is connected to the output of one-to-three RF divider 174 via delay line 184. In this way, second RF radiator 186b is configured to receive the RF signal regardless of the frequency of the signal.

In some embodiments, the reconfigurable antenna 170 operates in a first mode, second mode, and third mode. In the first mode, the frequency of the RF input is within a first frequency band filtered by both first RF filter 176 and second RF filter 178, such that the RF signal is provided only to the at least one RF radiator (e.g., RF antenna 186b). Operation in the first mode provides a first radiation pattern in response to an RF input provided in the first frequency band. The reconfigurable antenna 170 operates in the second mode when the frequency of the RF input is within a second frequency band passed by RF filter 176 but filtered by RF filter 178, such that the RF signal is provided to RF radiators 186a and 186b, but not to RF radiator 186c. Operation in the second mode provides a second radiation pattern—different from the first radiation pattern—in response to an RF input provided in a second frequency band. In the third mode, the frequency of the RF input is within a third frequency band that is passed by both the first RF filter 176 and the second RF filter 178, such that the RF signal is provided to each of the RF radiators 186a, 186b, and 186c. Operation in the third mode provides a third radiation pattern—different from the first and second radiation patterns—in response to an RF input provided in the third frequency band. In some embodiments, additional RF filters may be provided in conjunction with additional RF radiators to provide additional modes of operation, each mode of operation providing a different radiation pattern.

In this way, the present disclosure is directed to a radiation pattern reconfigurable antenna have two or more modes of operation selected based on the frequency of the signal provided at the input. In some embodiments, the reconfigurable antenna includes at least a first radiator and a second radiator adjacent to the first radiator. In response to a signal received at a first frequency, the signal is applied only to the first radiator and generates in response a first radiation pattern. In response to a signal received at a second frequency, the signal is applied to both the first radiator and the second radiator which generate in response a second radiation pattern different than the first radiation pattern.

Discussion of Possible Embodiments

The following are non-exclusive descriptions of possible embodiments of the present invention.

According to one aspect, a radiation pattern reconfigurable antenna includes an input port, a signal divider, a filter, and first and second radiators. The signal divider is connected to the input port and configured to divide a signal at the input port into a first output and a second output. The filter is connected to the second output, wherein the filter is configured to filter signal within a first frequency band and to pass signals within a second frequency band. The first radiator is configured to receive the signal from the first output of the signal divider, wherein the first radiator receives signals within the first frequency band and the second frequency band. The second radiator is connected to the filter to receive signals provided within the second frequency band.

The radiation pattern reconfigurable antenna of the preceding paragraph can optionally include, additionally and/or alternatively any, one or more of the following features, configurations and/or additional components.

For example, the radiation pattern reconfigurable antenna may provide the first radiation pattern in response to an RF signal in a first frequency band and a second radiation pattern in response to an RF signal in a second frequency band.

In some embodiments, the radiation pattern reconfigurable antenna may provide a first radiation pattern that is wider in the azimuth plane than the second radiation pattern.

In some embodiments, the radiation pattern reconfigurable antenna may utilize microstrip antennas as the first and second radiators.

In some embodiments, the radiation pattern reconfigurable antenna may utilize substrate integrated waveguide (SIW) slot antennas as the first and second radiators.

In some embodiments, the radiation pattern reconfigurable antenna may implement the input port, the signal divider and filter on a substrate integrated waveguide (SIW).

In some embodiments, the radiation pattern reconfigurable antenna may be configured such that the signal provided to the first radiator is in-phase with the signal provided to the second radiator.

In some embodiments, the radiation pattern reconfigurable antenna may be configured such that the signal provided to the first radiator is out-of-phase with the signal provided to the second radiator.

In some embodiments, the signals operated on by the radiation pattern reconfigurable antenna may be radio frequency (RF) signals.

According to another aspect, a radio detection and ranging (radar) sensor includes a transmission antenna configured to transmit RF signals, a receiver antenna configured to receive RF signals, a radar transceiver configured to provide an RF output to the transmission antenna for transmission and to receive an RF input from the receiver antenna, and a control and signal processing circuit connected to the radar transceiver to process the RF input to detect objects. In some respects, at least one of the transmission antenna and/or receiver antenna is a radiation pattern reconfigurable antenna that provides a first radiation pattern within a first frequency band and a second radiation pattern within a second frequency band.

The radar sensor of the preceding paragraph can optionally include, additionally and/or alternatively any, one or more of the following features, configurations and/or additional components.

For example, the reconfigurable antenna may include an RF input/output port, an RF divider/combiner, an RF filter, and at least a first RF radiator and at least a second RF radiator. The RF divider/combiner is connected to the RF input/output port, the RF divider having at least a first RF input/output and second RF input/output. The RF filter is connected to the second RF input/output, wherein the RF filter is configured to filter RF signals in the first frequency band and to pass RF signals in the second frequency band. The first RF radiator may be connected to the first RF input/output of the RF signal divider/combiner, wherein the first radiator receives/transmits RF signals provided in both the first frequency band and the second frequency band. The second RF radiator may be connected to the RF filter to receive/transmits RF signals provided in the second frequency band.

In some embodiments, the first radar coverage is wider in the azimuth plane than the second radar coverage.

In some embodiments, the first RF radiator may include first and second microstrip antenna sticks, and wherein the second RF radiator includes third and fourth microstrip antenna sticks.

In some embodiments, the RF divider/combiner and RF filters may be fabricated on a substrate integrated waveguide (SIW).

In some embodiments, the radar sensor further includes a first plurality of delay SIW lines connected between the first output of the RF divider/combiner and the first and second microstrip antennas and a second plurality of delay SIW lines connected between the RF filter and the third and fourth microstrip antennas, wherein the first plurality of delay SIW lines and the second plurality of delay SIW lines have a length selected to provide the RF signal in phase to at least the first and second microstrip antenna sticks and to the third and fourth microstrip antenna strips.

In some embodiments, the radar sensor may be implemented on a monolithic integrated microwave circuit (MMIC).

In some embodiments, radar sensor may utilize a plurality of transmission antenna and/or a plurality of receiver antenna configured to provide multiple-input-multiple-output (MIMO) communication.

According to another aspect, a method of generating different radiation patterns using a reconfigurable antenna having a single input port is provided. The method includes applying a signal having a first frequency to the input port of the reconfigurable antenna to generate a first radiation pattern and applying a signal having a second frequency to the input port of the reconfigurable antenna to generate a second radiation pattern, wherein the first radiation pattern is wider than the second radiation pattern.

The method of the preceding paragraph can optionally include, additionally and/or alternatively any, one or more of the following features, configurations and/or additional components.

In some embodiments, the reconfigurable antenna may include at least a first radiator configured to receive the signal applied at both the first frequency and the second frequency and at least a second radiator configured to only receive the signal applied at the second frequency.

In some embodiments, the signal applied to the single input port may be modulated between the first frequency and the second frequency.

In some embodiments, the method may further includes dividing the signal applied to the input port into at least a first and second signals, applying the first signal to a first radiator and selectively applying the second signal to a second radiator based on the frequency of the signal applied to the input port.

The invention claimed is:

1. A radiation pattern reconfigurable antenna comprising:
an input port configured to receive a signal that causes the antenna to provide either a radiation pattern for a narrow field of view or a radiation pattern for a wide field of view;
a signal divider connected to the input port and configured to provide the signal received from the input port to a first output and a second output;
a filter that acts as a switch connected to the second output, wherein the filter is configured to filter signal within a first frequency band and to pass signals within a second frequency band;
at least a first radiator connected to the signal divider via a first delay line and configured to receive the signal from the first output of the signal divider, wherein the first radiator receives signals within the first frequency band and the second frequency band; and
at least a second radiator connected to the filter via a second delay line and configured to receive the signal from the second output if the signal is within the second frequency band,
the first delay line and the second delay line configured to control a phase of the signal between the first radiator and the second radiator if the signal is within the second frequency band.

2. The radiation pattern reconfigurable antenna of claim 1, wherein a first radiation pattern is provided by the radiation pattern reconfigurable antenna if the signal is within the first frequency band and wherein a second radiation pattern is provided by the radiation pattern reconfigurable antenna if the signal is within a second frequency band.

3. The radiation pattern reconfigurable antenna of claim 2, wherein the first radiation pattern is wider in an azimuth plane than the second radiation pattern.

4. The radiation pattern reconfigurable antenna of claim 1, wherein the first radiator and the second radiator are microstrip antennas.

5. The radiation pattern reconfigurable antenna of claim 1, wherein the first radiator and the second radiator are substrate integrated waveguide (SIW) slot antennas.

6. The radiation pattern reconfigurable antenna of claim 1, wherein the input port, the signal divider and filter are implemented on a substrate integrated waveguide (SIW).

7. The radiation pattern reconfigurable antenna of claim 1, wherein the signal received by the first radiator is in-phase with the signal received by the second radiator.

8. The radiation pattern reconfigurable antenna of claim 1, wherein the signal received by the first radiator is phase shifted with respect to the signal received by the second radiator.

9. The radiation pattern reconfigurable antenna of claim 1, wherein the signal is a radio frequency (RF) signal.

10. A radar sensor comprising:
a transmission antenna configured to transmit RF signals;
a receiver antenna configured to receive RF signals;
a radar transceiver configured to provide an RF output to the transmission antenna for transmission and to receive an RF input from the receiver antenna; and
a control and signal processing circuit connected to the radar transceiver to process the RF input to detect objects;
wherein at least one of the transmission antenna or the receiver antenna is a radiation pattern reconfigurable antenna that provides a first radiation pattern within a first frequency band and a second radiation pattern within a second frequency band, the radiation pattern reconfigurable antenna comprising:
an RF input/output port;
an RF divider/combiner connected to the RF input/output port, the RF divider/combiner having at least a first RF input/output and second RF input/output;
an RF filter connected to the second RF input/output, the RF filter configured to filter RF signals in the first frequency band and to pass RF signals in the second frequency band;
at least a first RF radiator connected, via a first delay line, to the first RF input/output of the RF divider/combiner, the first radiator configured to transmit or receive RF signals provided in both the first frequency band and the second frequency band; and
at least a second RF radiator connected, via a second delay line, to the RF filter, the second RF radiator configured to transmit or receive RF signals passed by the RF filter in the second frequency band,
the first delay line and the second delay line configured to control a phase of the signal between the first radiator and the second radiator if the signal is within the second frequency band.

11. The radar sensor of claim 10, wherein a first radar coverage is wider in an azimuth plane than a second radar coverage.

12. The radar sensor of claim 10, wherein the first RF radiator includes first and second microstrip antenna sticks, and wherein the second RF radiator includes third and fourth microstrip antenna sticks.

13. The radar sensor of claim 12, wherein the RF divider/combiner and RF filters are fabricated on a substrate integrated waveguide (SIW).

14. The radar sensor of claim 12, further including:
a first plurality of delay SIW lines connected between a first output of the RF divider/combiner and the first and second microstrip antennas; and
a second plurality of delay SIW lines connected between the RF filter and the third and fourth microstrip antennas, wherein the first plurality of delay SIW lines and the second plurality of delay SIW lines have a length selected to provide the RF signal in phase to at least the first and second microstrip antenna sticks and to the third and fourth microstrip antenna sticks.

15. The radar sensor of claim 10, wherein the radar sensor is implemented on a monolithic integrated microwave circuit (MMIC).

16. The radar sensor of claim 10, wherein the transmission antenna includes a plurality of transmission antenna and wherein the receiver antenna include a plurality of receiver antenna configured for multiple-input-multiple-output (MIMO) communication.

17. A method of generating different radiation patterns using a radiation pattern reconfigurable antenna having a single input port, the method comprising:
applying a signal having a first frequency to the input port of the radiation pattern reconfigurable antenna to generate a first radiation pattern; and
applying a signal having a second frequency to the input port of the radiation pattern reconfigurable antenna to generate a second radiation pattern, wherein the first radiation pattern is wider than the second radiation pattern, a phase associated with the second radiation pattern controlled by delay lines connected to radiators of the radiation pattern reconfigurable antenna.

18. The method of claim 17, wherein the radiation pattern reconfigurable antenna includes at least a first radiator configured to receive the signal applied at both the first frequency and the second frequency and at least a second radiator configured to only receive the signal applied at the second frequency.

19. The method of claim 17, wherein the signal applied to the single input port is modulated between the first frequency and the second frequency.

20. The method of claim 17, wherein the method further includes:
dividing the signal applied to the input port into at least a first and second signals;
applying the first signal to a first radiator; and
selectively applying the second signal to a second radiator based on a frequency of the signal applied to the input port.

* * * * *